United States Patent [19]
Kim

[11] Patent Number: 5,943,228
[45] Date of Patent: Aug. 24, 1999

[54] METHOD AND ARRANGEMENT FOR SWITCHING POWER OF DISPLAY MONITOR WITH REMOTE CONTROLLER

[75] Inventor: Kook-Won Kim, Seoul, Rep. of Korea

[73] Assignee: SamSung Electronics Co., Ltd., Kyungki-do, Rep. of Korea

[21] Appl. No.: 09/086,336

[22] Filed: May 29, 1998

[30] Foreign Application Priority Data

May 29, 1997 [KR] Rep. of Korea .................. 97-21524

[51] Int. Cl.⁶ .................................................. H02P 13/00
[52] U.S. Cl. .................. 363/100; 340/654; 340/825.72; 359/146
[58] Field of Search ................................... 340/635, 654, 340/660, 825.72; 359/146; 307/126; 363/100; 323/318

[56] References Cited

U.S. PATENT DOCUMENTS 5,097,249 3/1992 Yamamoto ..................... 340/310.08
5,523,800 6/1996 Dudek ............................... 348/734

*Primary Examiner*—Shawn Riley
*Attorney, Agent, or Firm*—Robert E. Bushnell, Esq.

[57] ABSTRACT

A method for switching the power to a display monitor with a remote controller includes the steps of: (a) selecting a power-on/off switch of the display monitor by means of the remote controller; (b) checking whether the power to the display monitor before activation of a remote control to select the power-on/off switch is "on" or "off"; (c) reading the power-on/off state of the display monitor from a memory according to the result of step (b); and (d) generating a power-on/off signal according to the power-on/off state read from the memory. An arrangement for switching the power to a display monitor carries out functions corresponding to the above steps.

15 Claims, 3 Drawing Sheets

METHOD AND ARRANGEMENT FOR SWITCHING POWER OF DISPLAY MONITOR WITH REMOTE CONTROLLER

CLAIM OF PRIORITY

This application makes reference to, incorporates the same herein, and claims all benefits accruing under 35 U.S.C. §119 from my applications entitled METHOD OF SWITCHING POWER OF DISPLAY MONITOR WITH REMOTE CONTROLLER filed in the Korean Industrial Property Office on May 29, 1997 and there duly assigned Ser. No. P97-21524 by that Office.

BACKGROUND OF THE INVENTION

1. Technical Field

The present invention relates to a method and arrangement for switching the power to a display monitor with a remote controller and, more particularly, to a method and arrangement for switching the power to a display monitor with a remote controller which is adapted to control the switching operation of a plurality of display monitors in a simultaneous manner.

2. Related Art

Generally, electrical and electronic appliances have a number of control buttons to control all sorts of functions of the product, and the control buttons are normally disposed at defined positions on the front face of the system for the convenience of the user. However, the user must approach and be near to the electronic appliance in order to adjust or control the functions of the products with the control buttons.

Instead of inconveniently using the control buttons in controlling the electrical and electronic appliances, a remote controller is now widely used to control the electrical and electronic products or a remote control. For example, the most widely used computer systems employ computers whose power on/off function is controlled with a remote controller. A display monitor to visually display data generated by the computer is also a principal component in the computer system that has to maintain a close relationship with the user.

In some instances, a plurality of display monitors are employed in an arrangement, and a remote controller is commonly used to turn on/off the power to the display monitors. However, the use of a remote controller involves a problem in that it is difficult to turn on/off the power of display monitors in a simultaneous manner because the power-on signal of the remote controller has the same level as the power-off signal.

Therefore, there is a need for the development of a method and arrangement for switching the power to a display monitor with the remote controller which is designed to turn on/off the power to multiple display monitors in a simultaneous manner by sensing a power switching operation of the remote controller.

SUMMARY OF THE INVENTION

An object of the present invention is to provide a method and arrangement for switching the power to a display monitor with a remote controller which is designed to turn on/off the power to multiple display monitors in a simultaneous manner by sensing the power switching operation of the remote controller.

To achieve these and other advantages and in accordance with the purpose of the present invention, as embodied and broadly described, switching of the power to a display monitor with a remote controller is carried out in accordance with the following steps and functions: (a) selecting a power-on/off switch of the display monitor by means of the remote controller; (b) checking whether the power to the display monitor is "on" or "off" prior to actuation of a remote controller to select the power-on/off switch; (c) reading the power-on/off state of the display monitor from a memory according to the result of step (b); and (d) generating a power-on/off signal according to the power-on/off state read from the memory.

In another aspect of the present invention, the aforementioned step (c) involves reading the power-on state from the memory when the power to the display monitor before remote control is "off", and reading the power-off state from the memory when the power to the display monitor before remote control is "on".

In another aspect of the present invention, step (d) involves generating a power-on signal according to the power-on state read from the memory in step (c), and generating a power-off signal according to the power off state read from the memory in step (c).

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
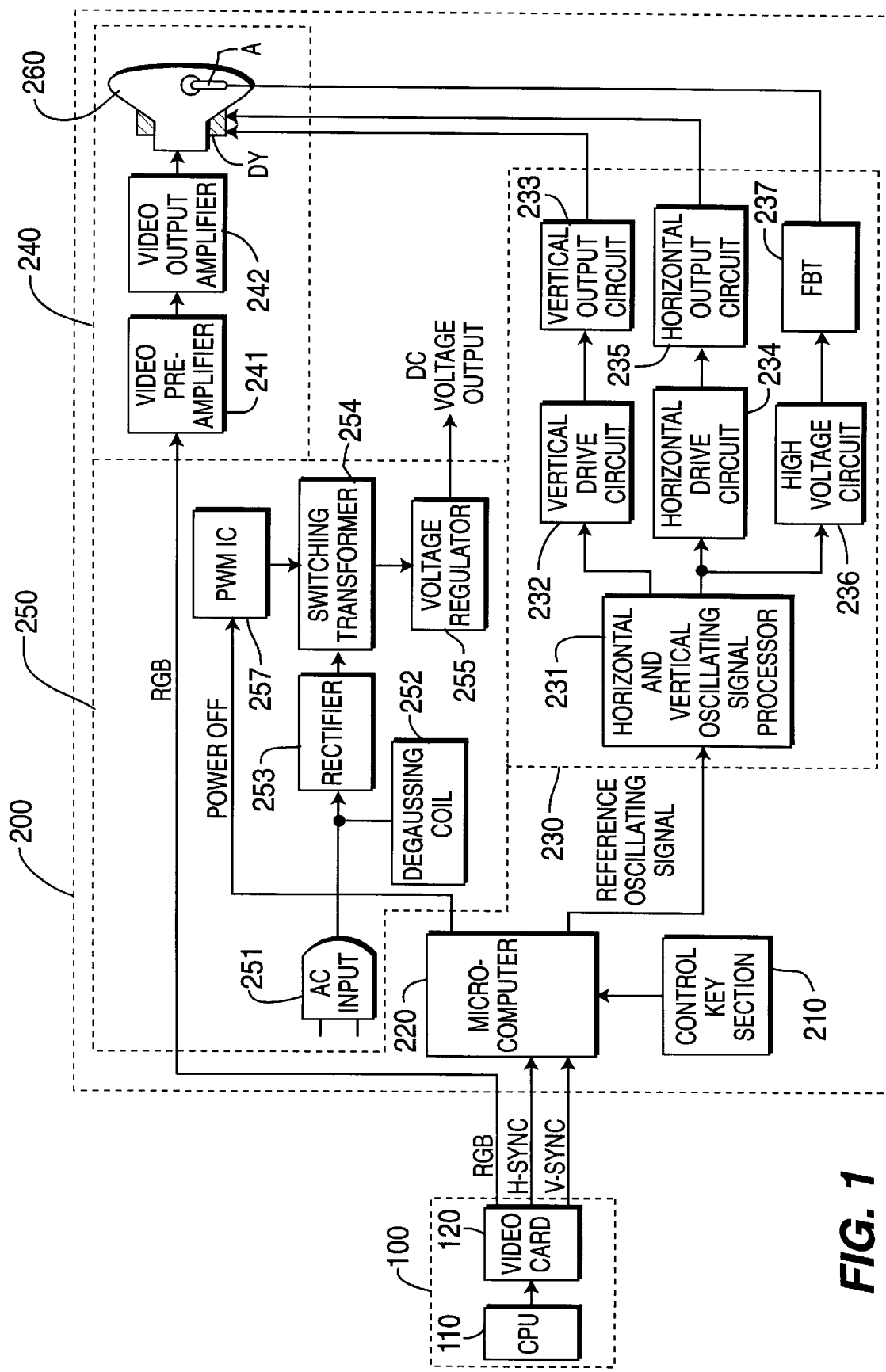
FIG. 1 is a block diagram of the internal circuit of a display monitor.

FIG. 1 is a block diagram showing the internal circuit of a display monitor.

As shown in FIG. 1, computer 100 is composed of a CPU 110 for processing a keyboard signal and thereby generating output data, and a video card 120 for processing the data received from the CPU 100 to form R, G and B video signals, and further generating horizontal and vertical sync signals H-SYNC and V-SYNC, respectively, which are to synchronize the R, G and 8 video signals.

Display monitor 200, which displays the R, G and B video signals received from the video card 120 in the computer 100, comprises: a control key section 210 for generating a key signal to control the screen of the display monitor 200; a microcomputer 220 receptive to horizontal and vertical sync signals H-SYNC and V-SYNC, respectively, generated by the video card 120, and generating an image adjusting signal and a reference oscillating signal in response to the key signal generated from the control key section 210; a horizontal and vertical output circuit section 230 responsive to the image adjusting signal and the reference oscillating signal generated by the microcomputer 220 for synchronizing the R, G and B video signals; a video circuit section 240 for boosting the R, G and B video signals generated by the video card 120 and displaying them; and a power supply circuit section 250 for supplying a drive voltage to microcomputer 220, horizontal and vertical output circuit section 230, and video circuit section 240.

The respective blocks in the display monitor 200 will be described in detail as follows.

Microcomputer 220 is responsive to the horizontal and vertical sync signals H-SYNC and V-SYNC, respectively, transferred from the video card 120 for generating an image adjusting signal and a reference oscillating signal in response to the key signal applied from the control key section 220.

Upon receipt of the image adjusting signal and the reference oscillating signal generated by the microcomputer 220, a horizontal and vertical oscillating signal processor 231 generates horizontal and vertical oscillating pulses for controlling the switching rate of a sawtooth wave generating circuit according to the horizontal and vertical sync signals H-SYNC and V-SYNC, respectively, received from the video card 120.

Vertical drive circuit 232 boosts the vertical oscillating pulse sent from the horizontal and vertical oscillating signal processor 231 and generates a drive current.

Vertical drive circuit 232 for boosting the vertical oscillating pulse can be one of two types which are most widely used: a one-stage vertical amplification type and an emitter follower type. The emitter follower type vertical drive circuit has a transistor which receives an input signal at its base, and which generates an output signal at its emitter. Accordingly, vertical drive circuit 232 normally performs an operation for the improvement of linearity instead of gain. The drive current amplified through the vertical drive circuit 232 is applied to a vertical output circuit 233, which supplies a sawtooth current corresponding to the vertical sync pulse to a deflection yoke DY, thereby determining a vertical scanning period.

On the other hand, a horizontal drive circuit 234 receives a horizontal oscillating signal generated by the horizontal and vertical oscillating processor 231, and thereby supplies a drive current high enough to switch the horizontal output circuit 235. Upon receipt of the drive current from the horizontal drive circuit 234, the horizontal output circuit 235 provides a sawtooth current to the deflection yoke DY, thereby determining a horizontal scanning period.

There are two driving methods of such a horizontal drive circuit 234: an in-phase type wherein the output is ON when the drive terminal is ON, and an out-of-phase type wherein the output is OFF when the drive terminal is ON.

In order to supply a high voltage to the anode terminal A of a CRT (Cathode Ray Tube) 260, high-voltage circuit 236 and FBT (FlyBack Transformer) 237 are driven to generate a high voltage according to the period of the horizontal oscillating pulse generated by the horizontal and vertical oscillating signal processor 231. Thus, high voltage is generated and applied to the anode terminal A of the CRT 260 to create an anodic surface of the CRT 260.

Video pre-amplifier 241 of the video circuit section 240 amplifies the R, G and B video signals of low level generated by the video card 120 to a specified voltage level. For example, a signal of less than 1 peak to peak voltage (hereinafter, referred to as Vpp) is boosted to a signal of 4 to 6 Vpp. Video output amplifier 243 further boosts the R, G and B video signals of 4 to 6 Vpp to those of 40 and 60 Vpp, thereby supplying energy to the respective pixels of the CRT 244 to display an image.

The picture displayed through the CRT 260 according to the R, G and B video signals has its scanning periods determined by the deflection yoke DY, and the picture is visually displayed on the screen of the CRT 260 with the luminance controlled on the anodic surface A of the CRT 260.

An alternating current (hereinafter, referred to as "AC") is fed into the power supply circuit section 250 through an AC input 251, and the power supply circuit section 250 provides a drive voltage for displaying the R, G and B video signals on the screen of the display monitor 200. The AC is applied to a degaussing coil 252 to troubleshoot the fuzzy indistinct colors caused by the influence of the earth magnetic field or the external environment.

Furthermore, the AC applied through the AC input 251 is rectified into a DC at a rectifier 253, and the DC is applied to a switching transformer 254. Thus switching transformer 254 supplies various drive voltages required in the display monitor 200 through a voltage regulator 255. In this case, PWM (Pulse Width Modulation) IC 256 senses the error of the drive voltage generated by the voltage regulator 255, so that it controls the switching time according to the sensed error so as to stabilize the voltage generated through the voltage regulator 255.

In order to economize power consumed in the display monitor 200, microcomputer 220 is under the control of a DPMS (Display Power Management Signaling) mode in response to the input of the sync signals generated by the video card 120. In the DPMS mode, the microcomputer 220 enters the standby mode to interrupt the R, G and B video signals if the horizontal sync signal H-SYNC is "off", while it enters the suspend mode to interrupt the deflection voltage when the vertical sync signal V-SYNC is "off".

Once the horizontal and vertical sync signals H-SYNC and V-SYNC, respectively, are interrupted, the DPMS off mode is activated to interrupt the power supply to the secondary terminal of the switching transformer 254 through the PWM IC 256 for reduction of power consumption in the display monitor 200.

Figure 2:
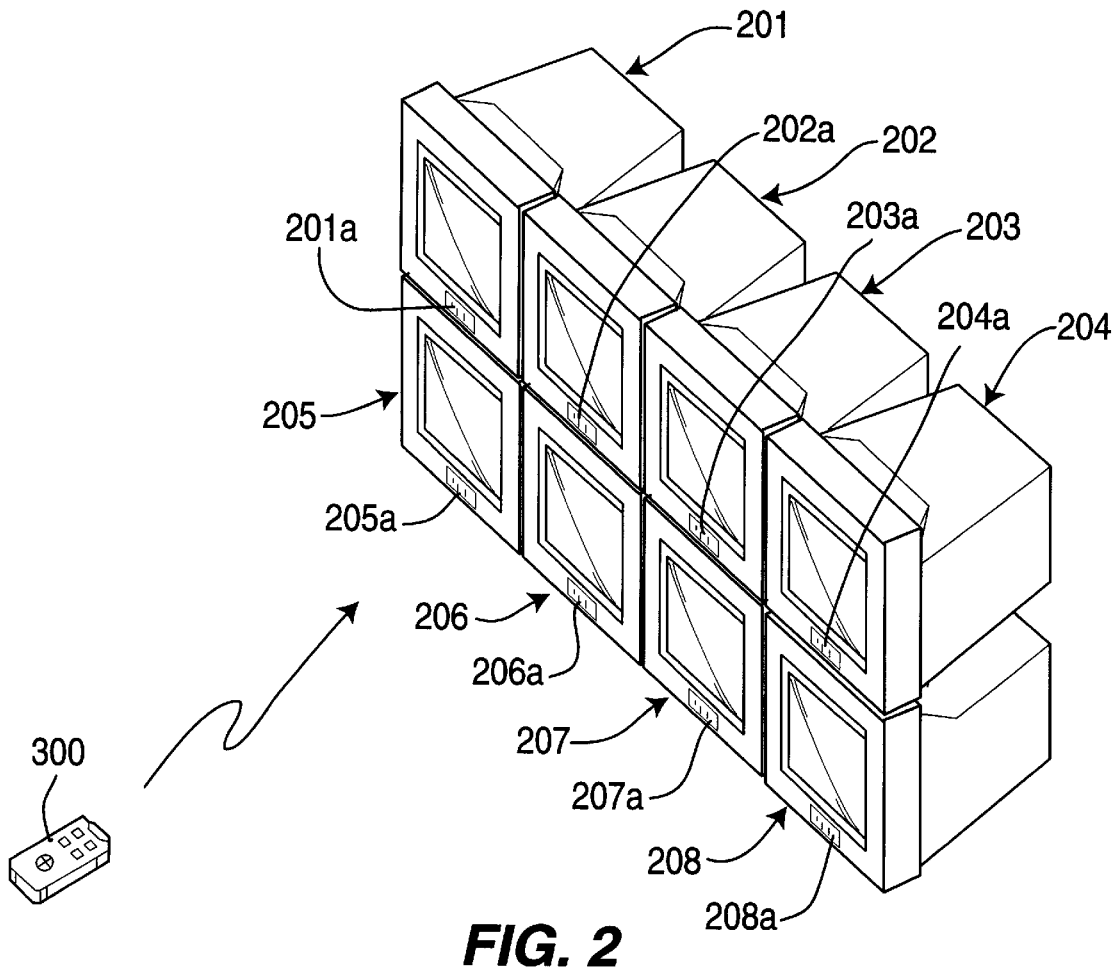
FIG. 2 is a diagram illustrating a general arrangement and operation for switching multiple display monitors with a remote controller.

If a plurality of display monitors 201–208 are placed on show an arrangement or other pattern of display, as shown in FIG. 2, a remote controller 300 is commonly used to turn on/off the power to the display monitors 201–208.

Light receiving sections 201a–208a are provided in the respective display monitors 201–208 for the control of the power of those plural display monitors using the remote controller 300. A power-on/off signal is generated by the remote controller 300, and is applied to the light receiving sections 201a–208a so that the power to the respective display monitors 201–208 is turned on/off.

However, the use of the remote controller 300 involves a problem in that it is hard to turn on/off the plural display monitors 201–208 in a simultaneous manner because the power-on signal of the remote controller 300 has the same level as the power-off signal.

Figure 3:
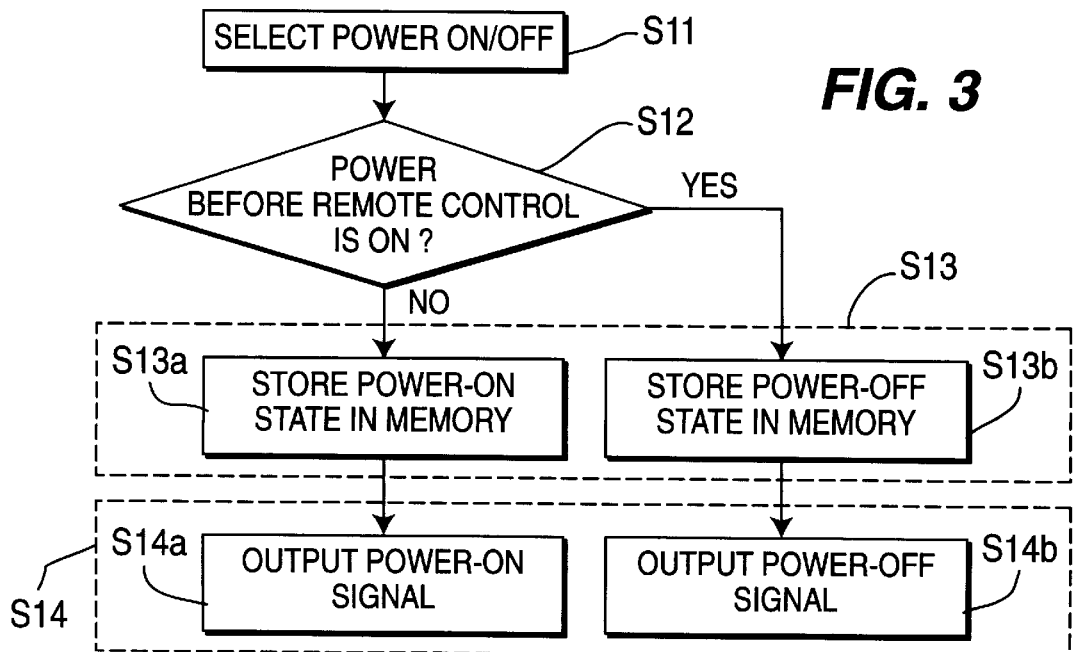
FIG. 3 is a flow chart illustrating a method of switching the power to a display monitor with a remote controller in accordance with the present invention.

FIG. 3 is a flow chart illustrating a method of switching the power of a display monitor with a remote controller in accordance with the present invention.

As shown in FIG. 3, the method includes the steps of: (S11) selecting a power-on/off switch of the display monitor 20 by means of a remote controller 10; (S12) checking whether the power to the display monitor 20 before actuation of remote control to select the power-on/off switch is "on" or "off"; (S13) storing the power-on/off state of the display monitor 20 in a memory according to the result of step S12; and (S14) generating a power-on/off signal according to the power-on/off state read from the memory in step S13.

The step S13 comprises the steps of: (S13a) storing the power-on state in the memory when the power to the display monitor before remote control is "off"; and (S13b) storing the power-off state in the memory when the power to the display monitor before the remote control is "on".

Further, the step S14 comprises the steps of: (S14a) generating a power-on signal according to the power-on state read from the memory in step (c); and (S14b) generating a power-off signal according to the power-off state read from the memory in step S13.

Figure 4:
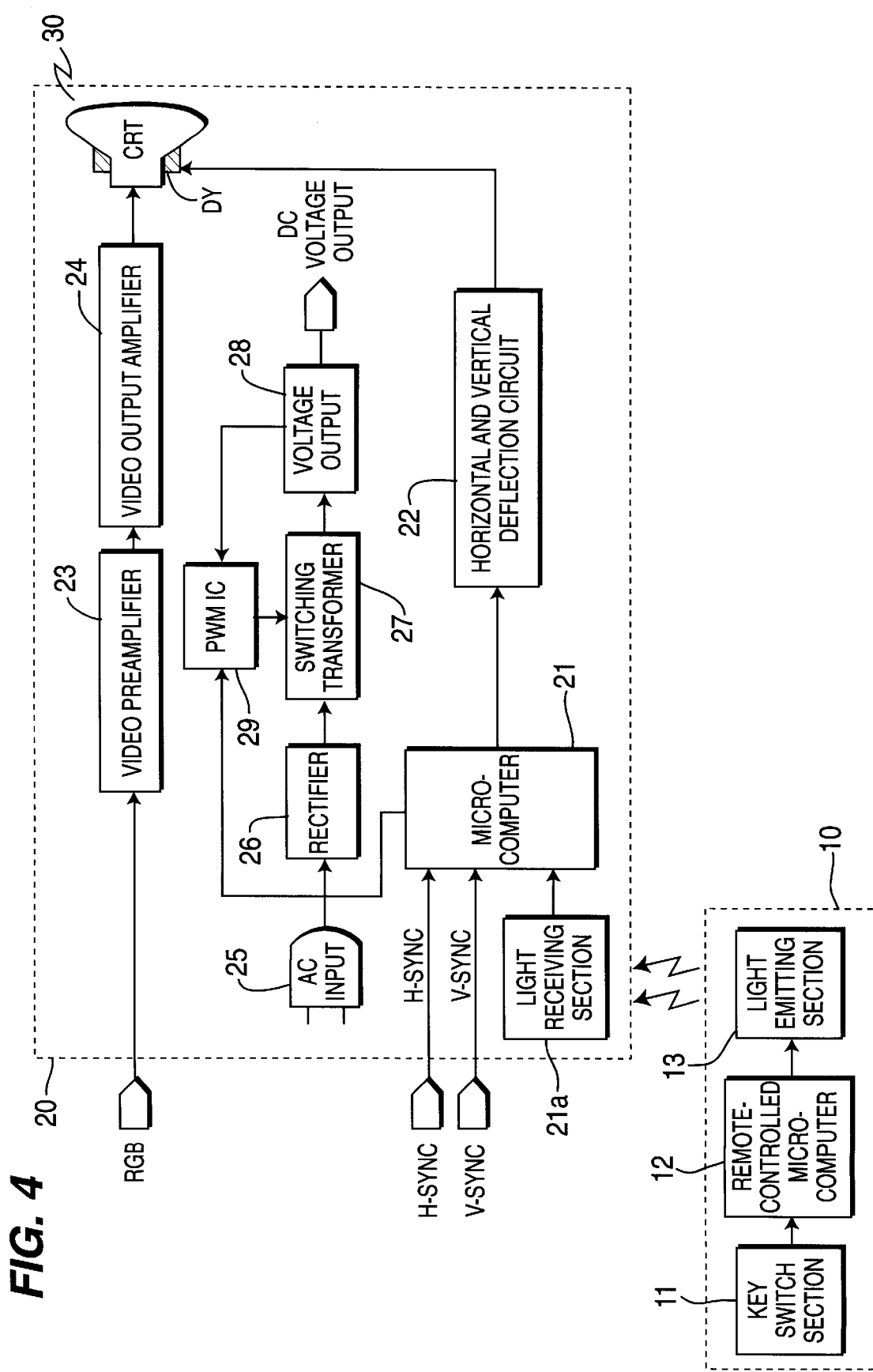
FIG. 4 is a block diagram illustrating the internal circuits of the remote controller and the display monitor in accordance with the present invention.

With reference to FIG. 4, a description is given below for a method of switching the power of the display monitor 20 with a remote controller.

First, the user presses the button on a key switch section 11 attached to the outer case of the remote controller 10 in order to control the display monitor 20, generating a key signal. The key signal is applied to a remote-controlled microcomputer 12.

Remote-controlled microcomputer 12 encodes the key signal received from the key switch section 11 to generate a remote control signal. Light emitting section 13 converts the remote control signal into a light signal. This light signal corresponding to the remote control signal is applied to light receiving section 21a in the display monitor 20.

The light receiving section 21a converts the light signal corresponding to the remote control signal into a voltage signal which is sent to the microcomputer 21 for analysis and control.

More specifically, if the key signal generated by the key switch section 11 in the remote controller 10 is an image adjusting signal, it is applied to the light receiving section 21a of the display monitor 20 via the remote-controlled microcomputer 12 and the light emitting section 13. Upon receipt of the key signal which is a signal to adjust the image, microcomputer 21 adjusts the image displayed on the screen of the CRT 30. That is, the CRT 30 displays the R, G and B video signals which have been generated by a computer (not shown) and boosted through video preamplifier 23 and video main amplifier 24. Thus, the created image is adjusted through the microcomputer 21.

For the adjustment of the image displayed on the screen of the CRT 30, microcomputer 21 is responsive to the key signal from the remote controller 10 and the horizontal and vertical sync signals H-SYNC and V-SYNC, respectively, generated by the computer for correcting the image adjusting signal received from the remote controller 10 and generating an oscillating pulse.

The oscillating pulse generated by the microcomputer 21 is applied to horizontal and vertical deflection circuit 22, which provides a sawtooth current to a deflection yoke DY according to the image adjusting signal applied thereto. Consequently, the image is displayed an the screen of the CRT 30 according to the period of the sawtooth current generated by the deflection yoke DY with the horizontal and vertical scanning periods thereof being determined.

In step S11, the user who wishes to control the power of the display monitor 20 presses the power-on/off select switch in the key switch section 11 of the remote controller 10. As the power-on/off select switch is pressed, a power-on/off switch signal is fed into the remote-controlled microcomputer 12.

On receiving the power-on/off switch signal, the remote-controlled microcomputer 12 checks the power state of the display monitor 20 prior to the receipt of the power-on/off switch signal in step S12. If the power to the display monitor 20 is "off", the power-on state is stored in the remote-controlled microcomputer 12 or in an erasable programmable read-only memory or EPROM (not shown) externally provided in step S13a.

Then, the remote-controlled microcomputer 12 converts a power-on signal into a light signal through the light emitting section 13 in step S14a. The light signal generated by the light emitting section 13 is applied to the light receiving section 21a of the display monitor 20 and is converted to a voltage signal. This voltage signal is sent to the microcomputer 21.

On the other hand, when the remote-controlled microcomputer 12 checks the power state of the display monitor 20 prior to receiving the power-on/off switch signal in step S12, if the power of the display monitor 20 is "on", the power-off state is stored in the remote-controlled microcomputer 12 or the EPROM (not shown) externally provided in step S13b.

In step S14b, the remote-controlled microcomputer 12 converts a power-off signal into a light signal through the light emitting section 13. The light signal generated by the light emitting section 13 is applied to the light receiving section 21a and is converted to a voltage signal. This voltage signal is sent to the microcomputer 21.

Microcomputer 21, upon receipt of the voltage signal sends the power-off signal to PWM IC 29, interrupting the output of the DC voltage generated by a voltage output 28 at the secondary terminal of a switching transformer 27. The switching transformer 27 is supplied with DC by rectifier 26 which receives AC at an AC input 25. Further, the PWM IC 29 controls the period of time for turning on the power according to the power-off signal received from the microcomputer 21 so that the current induced in the secondary terminal of the switching transformer 27 is interrupted to turn off the power to the display monitor 20.

As described above, the remote controller 10 memorizes the power-on/off state in turning on/off the power of the display monitor 20 and, accordingly, is used to switch multiple display monitors 201–208 in a simultaneous manner with ease, as shown in FIG. 2.

As the present invention is described above, only a single switch is provided on a remote controller in order to select the power-on/off state of a display monitor so that the remote controller can switch the powers of multiple display monitors simultaneously by controlling the power-on/off state memorized therein.

It will be apparent to those skilled in the art that various modifications and variations can be made in the method of switching the power of a display monitor with a remote controller according to the present invention without departing from the spirit or scope of the invention. Thus, it is intended that the present invention cover the modifications and variations of this invention provided they come within the scope of the appended claims and their equivalents.

What is claimed is:

1. A method for switching the power to a display monitor with a remote controller, comprising the steps of;
   (a) selecting a power-on/off switch of the display monitor by means of the remote controller;
   (b) checking whether the power to the display monitor, before a remote control to select the power-on/off switch is activated, is "on" or "off";

(c) storing the power-on/off state of the display monitor to a memory according to the result of step (b); and (d) generating a power-on/off signal according to the power-on/off state read from the memory;

wherein step (c) comprises the steps of:

storing the power-on state in the memory when the power to the display monitor, before activation of the remote control is, "off"; and storing the power-off state in the memory when the power to the display monitor, before activation of the remote control is, "on".

2. The method as defined in claim 1, wherein step (d) comprises the steps of:

generating a power-on signal according to a power-on state read from the memory in step (c); and generating a power-off signal according to a power-off state read from the memory in step (c).

3. An arrangement for switching the power to a display monitor with a remote controller, comprising:

selecting means for selecting a power-on/off switch of the display monitor by means of the remote controller;

determining means for determining whether the power to the display monitor, before a remote control is activated, is "on" or "off";

memory means for storing the power-on/off state of the display monitor in accordance with the determination made by said determining means;

reading means for reading the power-on/off state of the display monitor from said memory means in accordance with the determination made by said determining means;

generator means for generating a power-on/off signal in accordance with the power-on/off state read from said memory means by said reading means.

4. The arrangement as defined in claim 3, wherein said reading means reads the power-on state from said memory means when the power to the display monitor, before the remote control is activated, is "off"; and wherein said reading means reads the power-off state from said memory means when the power to the display monitor, before the remote control is activated, is "on".

5. The arrangement as defined in claim 3, wherein said generating means generates a power-on signal in accordance with the power-on state read from said memory means by said reading means;

wherein said generating means generates a power-off signal in accordance with the power-off state read from said memory means by said reading means.

6. An arrangement for switching the power to a display monitor, comprising:

remote controller means for remotely controlling the display monitor by transmitting a remote control signal thereto;

receiving means in said monitor for receiving said remote control signals; and memory means for storing a power-on/off state of the display monitor;

wherein said remote controller means selects a power-on/off switch of the display monitor and determines whether the power to said display monitor, before a remote control operation is activated, is "on" or "off";

wherein said remote controller means stores the power-on/off state of the display monitor in said memory means in accordance with said determination by said determining means; and wherein said remote control means reads the power-on/off state from said memory means and generates the power-on/off signal in accordance with a power-on/off state read from said memory means.

7. The arrangement as defined in claim 6, wherein said remote controller means reads the power-on state from said memory means when the power to the display monitor, before the remote control operation is activated, is "off"; and wherein said remote controller means reads the power-off state from said memory means when the power to the display monitor, before the remote control operation is activated, is "on".

8. The arrangement as defined in claim 6, wherein said remote controller means generates a power-on signal in accordance with the power-on state read from the said memory means; and wherein said remote controller means generates a power-off signal in accordance with the power-off state read from said memory means.

9. The arrangement as defined in claim 6, wherein said remote controller means comprises a key switch section for generating a key signal selecting said power-on/off of the display monitor, and a micro computer for determining whether the power to the display monitor is "on" and "off".

10. The arrangement as defined in claim 9, wherein said micro computer reads the power-on/off state of the display monitor from said memory means.

11. The arrangement as defined in claim 9, wherein said micro computer generates said power-on/off signal.

12. The arrangement as defined in claim 6, wherein said the remote controller means comprises a light emitting section for emitting an optical signal corresponding to said remote controller signal, and wherein said display monitor comprises a light receiving section for receiving said optical signal.

13. The method as defined in claim 1, further comprising the step, between steps (c) and (d), of reading the power-on state from the memory when the power to the display monitor, before activation of the remote control, is "off", and reading the power-off state from the memory when the power to the display monitor, before activation of the remote control, is "on".

14. The arrangement as defined in claim 3, wherein said memory means stores the power on state when the power to the display monitor, before the remote controller is activated, is "off/", and wherein said memory means stores the power-off state when the power to the display monitor, before the remote controller is activated, is "on".

15. The arrangement as defined in claim 6, wherein said memory means stores the power on state when the power to the display monitor, before the remote controller is activated, is "off", and wherein said memory means stores the power-off state when the power to the display monitor, before the remote controller is activated, is "on".

* * * * *